(12) United States Patent
Narayan et al.

(10) Patent No.: US 10,734,816 B2
(45) Date of Patent: Aug. 4, 2020

(54) IDENTIFYING OPERABILITY FAILURE IN DEMAND RESPONSE (DR) ASSETS

(71) Applicant: Autogrid, Inc., Redwood Shores, CA (US)

(72) Inventors: Amit Narayan, Cupertino, CA (US); Vijay Bhat, San Francisco, CA (US); Henry Schwarz, Foster City, CA (US)

(73) Assignee: AutoGrid Systems, Inc., Redwood Shores, CA (US)

( * ) Notice: Subject to any disclaimer, the term of this patent is extended or adjusted under 35 U.S.C. 154(b) by 440 days.

(21) Appl. No.: 14/442,904

(22) PCT Filed: Nov. 13, 2013

(86) PCT No.: PCT/US2013/069768
§ 371 (c)(1),
(2) Date: May 14, 2015

(87) PCT Pub. No.: WO2014/078336
PCT Pub. Date: May 22, 2014

(65) Prior Publication Data
US 2015/0295415 A1 Oct. 15, 2015

Related U.S. Application Data

(60) Provisional application No. 61/726,023, filed on Nov. 14, 2012.

(51) Int. Cl.
*H02J 4/00* (2006.01)
*G06Q 10/04* (2012.01)
(Continued)

(52) U.S. Cl.
CPC ............ *H02J 4/00* (2013.01); *G06F 17/18* (2013.01); *G06N 5/04* (2013.01); *G06Q 10/04* (2013.01); *G06Q 50/06* (2013.01)

(58) Field of Classification Search
None
See application file for complete search history.

(56) References Cited

U.S. PATENT DOCUMENTS

| 7,519,485 B2 | 4/2009 | Macgregor |
| 8,135,499 B2 | 3/2012 | Haugh |

(Continued)

FOREIGN PATENT DOCUMENTS

| WO | 2013039553 A1 | 3/2013 |
| WO | 2013039554 A1 | 3/2013 |

(Continued)

OTHER PUBLICATIONS

Yamaguchi, "Regression models for demand reduction based on cluster analysis of load profiles." Sustainable Alternative Energy (SAE) IEE PES/IAS Conference ON, IEEE, Piscataway, NJ, US (Sep. 28, 2009).

(Continued)

*Primary Examiner* — J. H. Hur
(74) *Attorney, Agent, or Firm* — Henry J. Cittone; Cittone Demers & Arneri LLP

(57) ABSTRACT

The present invention demonstrates a highly distributed demand response optimization and management system for real-time (DROMS-RT) power flow control to support large scale integration of distributed renewable generation into the grid. The system is a cloud-based platform that reduces critical peak power safely and securely. The arrangement is provided with a control and communications platform to allow highly dispatchable demand response (DR) services in timeframes suitable for providing ancillary services to the transmission grid. The services are substantially more efficient than other forms of ancillary service options currently available to manage the intermittency associated with large-scale renewable integration.

14 Claims, 2 Drawing Sheets

(51) Int. Cl.
*G06Q 50/06* (2012.01)
*G06F 17/18* (2006.01)
*G06N 5/04* (2006.01)

(56) References Cited

U.S. PATENT DOCUMENTS

| | | | | |
|---|---|---|---|---|
| 8,219,259 | B2 | 7/2012 | Haugh | |
| 2007/0247331 | A1* | 10/2007 | Angelis | G01D 4/006 340/870.02 |
| 2008/0077232 | A1 | 3/2008 | Nishide | |
| 2008/0177678 | A1* | 7/2008 | Di Martini | G01D 4/002 705/412 |
| 2009/0045976 | A1 | 2/2009 | Zoldi | |
| 2009/0106571 | A1 | 4/2009 | Low | |
| 2009/0187499 | A1* | 7/2009 | Mulder | G05B 15/02 705/30 |
| 2009/0240381 | A1 | 9/2009 | Lane | |
| 2010/0082174 | A1* | 4/2010 | Weaver | H02J 3/14 700/295 |
| 2010/0138363 | A1* | 6/2010 | Batterberry | G06Q 10/04 705/412 |
| 2010/0179704 | A1 | 7/2010 | Ozog | |
| 2010/0306027 | A1 | 12/2010 | Haugh | |
| 2011/0047418 | A1* | 2/2011 | Drees | G05B 15/02 714/57 |
| 2011/0055122 | A1* | 3/2011 | Andreoli | G06F 11/0751 706/12 |
| 2012/0036250 | A1* | 2/2012 | Vaswani | G01D 4/004 709/224 |
| 2012/0109388 | A1 | 5/2012 | Haugh | |
| 2012/0136496 | A1* | 5/2012 | Black | H02J 3/14 700/291 |
| 2012/0226930 | A1 | 6/2012 | Colban | |
| 2015/0295415 | A1* | 10/2015 | Narayan | G06Q 10/04 702/181 |

FOREIGN PATENT DOCUMENTS

| | | | |
|---|---|---|---|
| WO | 2013039555 | A1 | 3/2013 |
| WO | 20130309556 | A1 | 3/2013 |

OTHER PUBLICATIONS

Yousefi, "Optimal real time pricing in an agent-based retail market using a comprehensive demand response model," Energy, Pergamon Press, Oxford, 36(9): 5716-5727 (Jun. 20, 2011).
Fan, "A real-time implementation of short-term load forecasting for distribution power systems," IEEE transactions on power systems. 9(2):988-994 (May 1, 1994).
Vaziri, "Smart grid, Distributed Generation, and standards," Power and Energy Society General Meeting, 2011 IEEE, IEEE, pp. 1-8 (Jul. 24, 2011).
Mohagheghi, "Demand Response Architecture: Integration into the Distribution Management System", Smart Grid Communications, 2010 First IEEE International Conference, IEEE, Piscataway, NJ, USA, (Oct. 4, 2010), pp. 501-506, XP031790278, ISBN: 978-1-4244-6510-1.
Andersson, "Intelligent load shedding to counteract power system instability", Transmission and Distribution Conference and Exposition: Latin America , 2004 IEEE/PES Sao Paulo, Brazil (Nov. 8, 2004), Piscataway, NJ, USA,IEEE, (Aug. 11, 2004), pp. 570-574, XP010799925, DOI: 10.1109/TDC.2004.1432442ISBN: 978-0-7803-8775-1.
Farrokh, "Intelligent Load Shedding", IEEE Industry Applications Magazine, IEEE Service Center, Piscataway, NJ, US, vol. 17, No. 2, (Mar. 1, 2011), pp. 44-53, XP011344142, ISSN: 1077-2618, DOI: 10.1109/MIAS.2010.939814.
Mathieu, "Variability in automated responses of commercial buildings and industrial facilities to dynamic electricity prices", Energy and Buildings, Lausanne, CH, vol. 43, No. 12, (Aug. 22, 2011) pp. 3322-3330, XP028104123, DOI: 10.1016/J.ENBUILD. 2011.08. 020.
Lynch, "Estimation Errors in Demand Response with Large Customers, Applications for Load Research." (Nov. 1, 2009) XP055053852.
Bartholomew, "Response Measurement & Verification." Applications for Load Research11, (Mar. 1, 2009) XP55053592.
Written Opinion of the International Searching Authority dated Mar. 18, 2014 in International Application No. PCT/US2012/000398.
International Preliminary Report on Patentability dated Mar. 18, 2014 in International Application No. PCT/US2012/000398.
International Search Report dated Mar. 3, 2013 in International Application No. PCT/US2012/000398.
International Preliminary Report on Patentability dated Mar. 18, 2014 in International Application No. PCT/US2012/000399.
Written Opinion of the International Searching Authority dated Mar. 18, 2014 in International Application No. PCT/US2012/000399.
Written Opinion of the International Searching Authority dated Mar. 18, 2014 in International Application No. PCT/US2012/000400.
International Preliminary Report on Patentability dated Mar. 18, 2014 in International Application No. PCT/US2012/000400.
International Search Report dated Feb. 14, 2013 in International Application No. PCT/US2012/000400.
International Search Report dated Feb. 26, 2013 in International Application No. PCT/US2012/000401.
International Search Report, PCT/US/2013/069768, dated Mar. 20, 2014.
European Search Report, EP 13 85 5119, dated Mar. 11, 2016.
International Preliminary Report on Patentability, PCT/US/2013/069768, dated May 19, 2015.
Written Opinion of the International Searching Authority, PCT/US/2013/069768, dated Mar. 20, 2014.

* cited by examiner

IDENTIFYING OPERABILITY FAILURE IN DEMAND RESPONSE (DR) ASSETS

CROSS-REFERENCE TO RELATED APPLICATIONS

This application is the U.S. national stage of PCT International Patent Application No. PCT/US2013/069768, filed Nov. 13, 2013 which claims priority to U.S. Provisional Patent Application No. 61/726,023, filed Nov. 14, 2012, the disclosures of each of which are hereby incorporated by reference in their entirety.

FIELD OF THE INVENTION

The present invention relates generally to demand response (DR) measurement and verification (M&V) and demand response (DR) device operability analysis; and more particularly to statistical algorithms applied to automatic detection of mechanical failures in dispatchable demand response assets.

BACKGROUND OF THE INVENTION

Demand response (DR) is a mechanism to manage customer's consumption of electricity in response to supply conditions, for example, having electricity customers reduce their consumption at critical times or in response to market prices. Demand response is generally used to encourage consumers to reduce demand, thereby reducing the peak demand for electricity. Demand response gives the consumers the ability to voluntarily trim or reduce their electricity usage at specific times of the day during high electricity prices, or during emergencies.

In other words, demand response is a resource that allows end-use electricity customers to reduce their electricity usage in a given time period, or shift that usage to another time period, in response to a price signal, a financial incentive, an environmental condition, or a reliability signal. Demand response saves ratepayer's money by lowering peak time energy usage that is high-priced. This lowers the price of wholesale energy, and in turn, retail rates. Demand response may also prevent rolling blackouts by offsetting the need for more electricity generation and can mitigate generator market power.

There are two general classes of DR program—dispatchable and non-dispatchable. Non-dispatchable DR is not dependent on explicit signaling from the load serving entity (LSE) to the participant. Examples of non-dispatchable DR include time-of-use (TOU) and real time pricing (RTP) programs. In contrast, dispatchable demand response entails the load serving entity sending explicit signals to participants to reduce energy consumption during a specified time window. The signals can either communicate economic incentives to participants or control participant devices directly. An example of the former is critical peak price (CPP) demand response programs, while the latter are referred to as direct load control (DLC) demand response.

For both types of dispatchable demand response there are switches and signal receptors at the participant site that must function properly for the desired load curtailment to be realized. An important issue facing load serving entities is that as large numbers of these devices fail, the overall effectiveness of the demand response (DR) program is severely degraded. Load serving entities can perform physical on-site inspections to monitor and fix broken devices, but this approach is extremely expensive to scale up to many thousands of participants if the inspections are not well-targeted to those sites with a high probability of device failure. Alternatively, waiting for participants to self-report a failed device before visiting a site can result in consistently poor demand response performance over the course of the program.

Given the above, there is a huge value in a system that can analyze real-time and historical data on demand response event performance and automatically identify those participants that have a high-probability of device failure. The demand response optimization and management system for real time system contains an operability analysis engine (OAE) that employs advanced, customized statistical methods to generate a probability that a given participant has a device failure based on historical interval meter data.

SUMMARY OF THE INVENTION

The present invention describes a highly distributed demand response optimization and management system. The system utilizes a scalable, web-based software-as-a-service platform that provides all program designs, implementation and execution, event management, forecasting, optimal dispatch and post-event analytics functionality. The system uses advance machine learning and robust optimization techniques for real-time and "personalized" demand response-offer dispatch. The system's learning engine keeps track of available demand side resources and history of participation in different demand response events at individual customer locations. This data is used to build a virtual profile for each customer that is able to forecast the amount of load-shed, shed-duration, and rebound effects for that customer given the time-of-day, weather and price signal. The virtual profiles for the customers are generated in an online manner and are continuously updated in real-time as more usage data becomes available.

The embodiment of the present invention provides a demand response optimization and management system for real-time that comprises a utility data feed, a resource modeler, a forecasting engine, an optimization engine comprising an optimizer and a dispatch engine, a baseline engine, a customer/utility interface and a customer data feed. The arrangement described herein is provided with a control and communications platform to allow highly dispatchable demand response (DR) services in timeframes suitable for providing ancillary services to the transmission grid. The services are substantially more efficient than other forms of ancillary services options currently available to manage the intermittency associated with large-scale renewable integration.

The present invention identifies operability failures in demand response assets by employing a customized 2-stage statistical method as a mixture model stage and a Bayesian update stage. The two customized stages generate the probability of a device failure for each demand response participant based on historical meter data and participant baseline load (PBL) estimates produced by an operability analysis engine (OAE). Demand response optimization and management system for real-time leverage the low-cost, open, interoperable demand response signaling technology, open automated demand response (OpenADR), and internet-protocol based telemetry solutions to reduce the cost of hardware, allowing DROMS-RT to provide dynamic price signals to millions of open automated demand response clients. The present invention described herein has its implementation in the demand response system; however it does not limit the scope of the described invention.

Abbreviations and Definitions

Demand Response Optimization and Management System for Real-Time (DROMS-RT): DROMS-RT is a highly distributed demand response optimization and management system for real-time power flow control to support large scale integration of distributed generation into the grid.

Demand Response (DR): Demand response is a mechanism to manage customer consumption of electricity in response to supply conditions. DR is generally used to encourage consumers to reduce demand, thereby reducing the peak demand for electricity.

Forecasting Engine (FE): The forecasting engine generates short-term forecasts of participant-level baseline load (BL).

Operability Analysis Engine (OAE): The operability analysis engine generates the probability that a given participant has a device failure, based on historical DR event results.

Participant Baseline Load (PBL): The estimated non-curtailed load of a participant over a period of time; that is, the load that would have happened had a DR event not been called for the time interval in question.

Load Serving Entities (LSE): A load-serving entity secures energy, transmission and related interconnected operations services, to serve the electrical demand and energy requirements of its end-use customers.

Measurement and Verification (M&V): Measurement and verification (M&V) is the independent analysis and reporting of demand side management and energy efficiency (DSMEE) saving impacts.

Real Time Pricing (RTP): Real time pricing means tarrifed retail charges for delivered electrical power and energy that vary hour-to-hour.

Critical-Peak Pricing (CPP): Critical-peak pricing is a pricing technique that helps to reduce electricity bill and it can be used in periods of high electricity demand.

Direct Load Control (DLC): Direct load control allows a utility to turn on and off specific appliances during peak demand periods.

Time Of Use (TOU): Time of use means that the electricity prices are set for a particular time period on an advance basis.

Cumulative Distribution Function (CDF): Cumulative distributive function gives the probability that a random variable is less than or equal to the independent variable of the function.

Expectation-Maximization (EM) algorithm: EM algorithm is an iterative method for finding maximum likelihood estimates of parameters in statistical models, where the model depends on unobserved latent variables.

Failure Detection Engine (FDE): Failure detection engine is used for automatic detection of mechanical failures in dispatchable DR assets.

Baseline Load (BL): Baseline load is a key to accurately assess the load impacts from certain types of demand response programs, particularly those that pay directly for load reductions.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE INVENTION

In the following detailed description of the embodiments of the invention, numerous specific details are set forth in order to provide a thorough understanding of the embodiments of the invention. However, it will be obvious to a person skilled in the art that the embodiments of the invention may be practiced without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variation, substitutions and equivalents will be apparent to those skilled in the art without parting from the spirit and scope of the invention.

Figure 1:
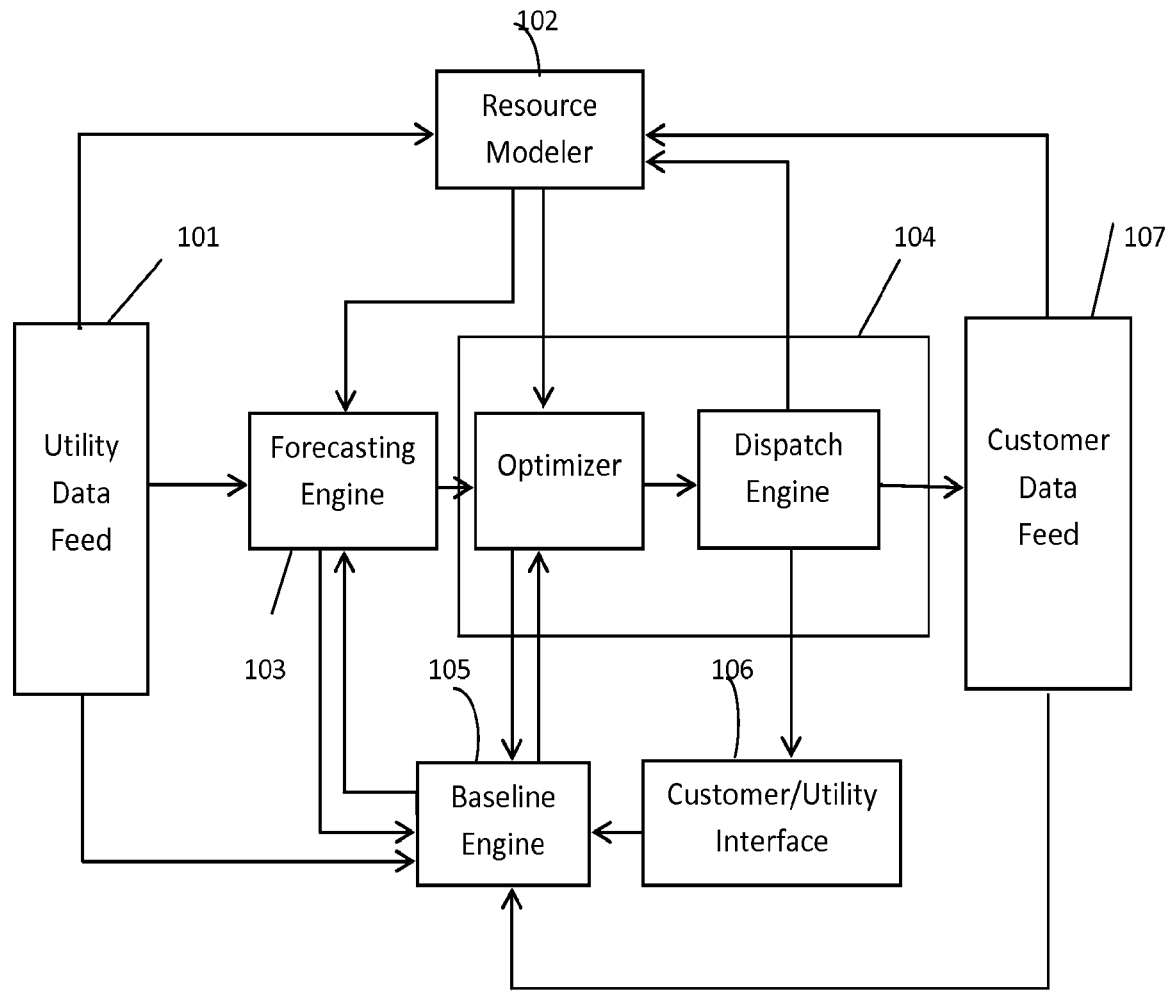
FIG. 1 is a schematic representation of the demand response optimization and management system for real-time, in accordance with an embodiment of the present invention.

Referring to FIG. 1, a demand response optimization and management system for real-time comprises a utility data feed 101, a resource modeler 102, a forecasting engine 103, an optimization engine 104, a baseline engine 105, a customer/utility interface 106 and a customer data feed 107. The demand response optimization and management system for real-time connects to the utility's backend data system 101 on one side and customer end-points 108 on the other side. The demand response optimization and management system receives live data-feeds from either or both the customer data feed 107 and the utility data feed 101 to calibrate the forecasting and optimization functions of DROMS-RT, during the execution of a demand response event. However, some of the feeds may not be available all the time or in real-time; the forecasting engine 103 is able to run in an "off-line" manner or with partial data feeds in these cases.

The demand response resource modeler 102 within demand response optimization and management system for real-time keeps track of all the available demand response resources, their types, their locations and other relevant characteristics such as response times, ramp-times etc. The resource modeler 102 continuously updates the availability of resources affected by commitment to or completion of an event and monitors the constraints associated with each resource such as the notification time requirements, number of events in a particular period of time, number of consecutive events and user preferences to determine a "loading order" as to which resources are more desirable for participation in demand response events from a customer's perspective and the contract terms the price at which a resource is willing to participate in an event. The resource modeler 102 gets data feed from the client to determine if the client is "online" (i.e. available as a resource) and whether the client has opted-out of the event.

The forecasting engine 103 gets the list of available resources from the resource modelers 102. The forecasting engine 103 performs short-term forecasts of aggregate load and available load-sheds for individual loads connected to the demand response optimization and management system for real-time. The forecasting engine 103 accounts for a number of explicit and implicit parameters and applies machine learning (ML) techniques to derive short-term load and shed forecasts as well as error distributions associated with these forecasts. The estimation of error distribution improves the overall robustness of optimization and helps to separate small load sheds during the events. The forecasting engine 103 gets continuous feedback from the client devices through the baseline engine 106 and increases its forecasting ability as more data becomes available to the system.

The optimization engine 104 comprises an optimizer and a dispatch engine. The optimization engine 104 takes the available resources and all the constraints from the resource modeler 102 and the forecasts of individual loads and load-sheds and error distributions from the forecasting engine 103 to determine the optimal dispatch of demand response under a given cost function. The optimization engine 104 incorporates a variety of cost functions such as cost, reliability, loading order preference, GHG or their weighted sum and makes an optimal dispatch decision over a given time-horizon that could cover day-ahead and near real-time horizons simultaneously. The optimization engine 104 is able to automatically select the mix of demand response resources best suited to meet the needs of the grid such as peak load management, real-time balancing, regulation and other ancillary services.

The baseline engine 105 verifies whether a set of customers have met their contractual obligation in terms of loadsheds. The baseline engine 105 uses signal processing techniques to identify even small systematic load sheds in the background of very large base signals. The forecasting engine 103 provides baseline samples and the error distribution to the baseline engine 105. In addition, the baseline engine 105 gets the data feed from the meter which is the actual power consumption data. The baseline engine 105 uses 'event detection' algorithm to determine whether the load actually participated in the demand response event, and if so, what the demand reduction due to this event was. The baseline engine 105 feeds data back to the forecasting engine 103 so that it could be used to improve the baseline forecast.

Figure 2:
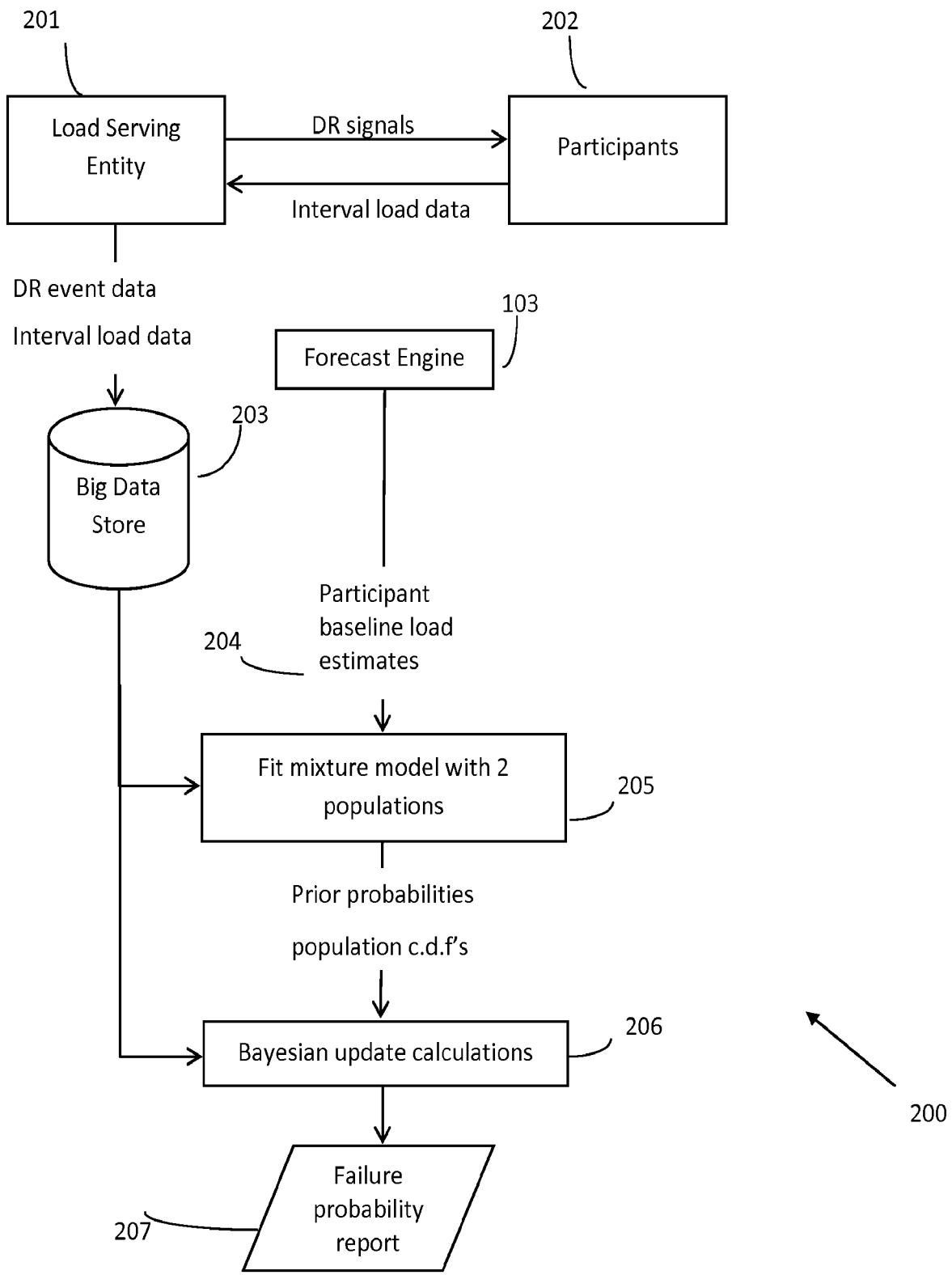
FIG. 2 is a block diagram illustrating the inputs and outputs of the operability analysis engine, in accordance with an embodiment of the present invention.

Referring to FIG. 2, the present invention 200 identifies likely operability failures in demand response assets by employing a customized 2-stage statistical method that generates the probability of a device failure 207 for each demand response participant based on historical meter data 203 and participant baseline load (PBL) estimates 204 produced by the operability analysis engine (OAE) 200.

As a pre-requisite for running the operability analysis engine (OAE), the demand response optimization and management system for real-time collects and stores meter interval data 203 from utility data feed 101 and customer data feed 107 through a large-scale data storage technology such as Hadoop/Hbase. In addition, the forecasting engine (FE) 103 generates participant baseline load values 204 from the data available in the baseline engine 105 for each historical time interval. These values are estimates of what the load would have been in the absence of any demand response event. For each (DR event, participant) combination in the historical data, the operability analysis engine 200 generates a dataset comprising the following quantities:

$$x_{i,j} = \text{observed percentage load reduction for event } i, \text{participant } j$$
$$= \text{load\_shed/baseline}$$
$$= (b_{i,j} - a_{i,j})/b_{i,j}$$

Where,
$b_{i,j}$=estimate of baseline load produced by the forecasting engine
$a_{i,j}$=actual realized load The goal of the operability analysis engine 200 is to infer from the dataset of $x_{i,j}$'s the probability of device failure for each participant. It does this in two steps: Firstly, fit a mixture model 205 to the dataset X comprising two populations, one corresponding to participants with fully operable devices (population A), the other corresponding to those with non-operable devices (population B). Outputs of this step are:
$w_A$=proportion of all participants that are in A; $w_B=(1-w_A)$= proportion of all participants that are in B; $F_A(x)$=cumulative distribution function (c.d.f.) for population A; and $F_B(x)$= cumulative distribution function (c.d.f) for population B. Secondly, for each participant j, compute Bayesian updates 206 of the probability that j has a non-operable device, given a set of realized event outcomes $x_j$.

This two-step approach allows for different choices of distribution in the mixture model step, as well as different definitions of realized event outcomes in the Bayesian update step. In one instance of the invention the dataset can be modeled as a mixture of two lognormal distributions. The lognormal distribution enables observed loads for population A (participants with operable devices) to be expressed as a multiplicative set of factors:

$$\text{observed\_load}_{i,j}=b_{i,j}*e_{i,j}*S*z_{i,j}$$

Where,
$b_{i,j}$=estimate of baseline load produced by the forecasting engine for event i, participant j
$e_{i,j}$=log-normal noise term that captures baseline error, mean=1
S=average load shed multiplier for the population
$z_{i,j}$=log-normal noise term that captures variance in load shed, mean=1
The observed percentage load shed is therefore:

$$x_{i,j} = \text{observed\_load}_{i,j}/b_{i,j}$$
$$= e_{i,j}*S*z_{i,j}s$$

Taking logs produces:
$$\log(x_{i,j})=e'_{i,j}+S'+z'_{i,j}$$

In this expression, e' and z' are noise terms with mean 0 and $\text{var}^e$ and $\text{var}^z$, respectively, and S' is the natural log of the average load shed multiplier S. Under this model, the log of the observed load sheds for participants with operable devices is normally distributed with mean S', and variance $\text{var}^e+\text{var}^z$.

For participants in population B (i.e. those with non-operable devices), there is no demand response induced load shed by definition, so the model reduces to:

$$\text{observed\_load}_{i,j}=b_{i,j}*e_{i,j}$$

Where,
$x_{i,j}$=observed\_load$_{i,j}$/$b_{i,j}$
$x_{i,j}=e_{i,j}$
$\log(x_{i,j})=e'_{i,j}$ The log of the observed load sheds for population B participants is normally distributed with mean 0 and variance $var^e$. Note that the population A participants have two sources of variance—baseline error and load shed variability—while population B participants only have the first source of variance. With the log-normal assumption, the logged data can therefore be modeled as a mixture of two normal distributions:

Population A~$N(S', var^e+var^z)$
Population B~$N(0, var^e)$

Note that in this formulation there are only 3 unknowns that need to be estimated—$S'$, $var^e$ and $var^z$. The operability analysis engine estimates these 3 quantities, plus the weighting proportion $w_A$, using the well-known expectation-maximization (EM) algorithm. Once $S'$, $var^e$ and $var^z$ are estimated, the log-normal c.d.f.'s $F_A(x)$ and $F_B(x)$ are derived.

In a specific instance of the invention, the Bayesian update step of the method is implemented using parameters (both prior and conditional probabilities) derived from the mixture model:

Use $F_A(0)$ and $F_B(0)$ to calculate the probabilities $p^A$ and $p^B$, the probability of negative load shed for population A and B, respectively.

Calculate the probability of observing x negative load sheds out of N events using the binomial distribution with probability p and sample size N.

Given a participant's observed number of positive load sheds after N events, calculate the probability of being in population B (i.e. having a non-operable device) using Bayes' Rule:

$$p(B|x)=p(x|B)*p(B)/[p(A)*p(x|A)+p(B)*p(x|B)]$$

Where,
$P(x|B)=binom(p^B, N)$
$p(x|A)=binom(p^A, N)$ $$p(A) = \text{the weighting factor from the mixture model}$$
$$= w_A$$
$$p(B) = (1 - w_A)$$

Demand response optimization and management system for real-time generates a report of the updated probabilities p(B) associated with each participant after each demand response event. Users can then take appropriate remedial action for those participants with high probability of device failure, thereby greatly increasing the efficacy of dispatchable demand response programs.

The advantages of the present invention are implementation of a system for automatic detection of mechanical failures in dispatchable demand response assets that results in reduced cost and increase in demand response performance during the course of the program.

We claim:

1. A method for determining a non-operable state of a device of a customer in a demand response system and taking remedial action for a non-operable device using a computer executing instructions comprising:
    collecting, by the demand response system, meter interval data of the customer using a utility data feed and a customer data feed;
    generating, by an operability analysis engine for each demand-response event and customer combination, a data set having two subsets based on meter interval data, a first subset having a population with operable devices and a second subset having a population with non-operable devices;
    determining, by the demand response system, a cumulative distribution function for the population in the first subset and for the population in the second subset;
    determining, by the demand response system, a probability of the customer having the non-operable device by computing Bayesian updates for a customer in the first subset and the second subset,
    wherein said probability is calculated by using a set of realized event outcomes and is based on a historic meter data and a baseline load and wherein the non-operable devices are one or more switches or signal receptors; and
    observing a subset of customers based on the determined probability of the customer having a non-operable device
    taking remedial action for customers with high probability of device failure.

2. The method of claim 1 wherein the utility data feed and the customer data feed are captured using a large scale data storage technology.

3. The method of claim 1 wherein the Bayesian updates are performed on a lognormal function of the cumulative distribution functions of the population in the first subset and the second subset.

4. The method of claim 1 wherein the Bayesian update is used to calculate the probability of a device in the population of the second subset.

5. A method for deriving a probability of a device to be in a non-operable state in a dataset of a plurality of customers and of taking remedial action for a non-operable device in a demand response event comprising:
    collecting meter interval data of a customer by a utility data feed and a customer data feed in a demand response system;
    segmenting, by an operability analysis engine, the dataset into two subsets based on meter interval data: a first subset having a population with operable devices and a second subset having a population with non-operable devices for each combination of the demand-response event and the customer;
    expressing the dataset as a mixture of lognormal distribution of the first subset and the second subset to enable an observed load to be expressed as multiplicative set of factors;
    determining variance values associated with the first subset and the second subset, and weighting proportions of the first subset and the second subset;
    deriving the lognormal distribution of cumulative distribution function for the first subset and the second subset;
    performing a Bayesian update on the lognormal distribution of cumulative distribution function for the first subset and the second subset to determine the probability of the device to be in non-operable state;
    observing a subset of customers based on the determined probability of the customer having a non-operable device;
    taking remedial action for customers with a high probability of device failure wherein the devices are one or more switches or signal receptors.

6. The method of claim 5 wherein the set of factors comprises estimate of baseline load generated by forecasting engine, noise that captures baseline error, noise that capture variance in load shed and average load shed multiplier for the population in the first subset.

7. The method of claim 5 wherein the variance value comprises variance associated with the noise error regard to baseline and the load shed variability.

8. The method of claim 5 wherein the dataset is expressed as a mixture of two lognormal distributions of the population in the first subset and the second subset.

9. The method of claim 5 wherein the variance values associated with the first subset and the second subset and the weighing proportion is calculated by an expectation-maximization algorithm.

10. The method of claim 5 wherein the cumulative distribution function is used to calculate the probability of negative load shed for the first subset and the second subset.

11. The method of claim 5 wherein the Bayesian update function is used to calculate the probability of device to be in non-operable state by observing the number of positive load sheds for a number of demand response events.

12. A method for determining a non-operable state of a device of a customer and of taking remedial action for a non-operable device in a demand response system using a computer executing instructions comprising:
collecting meter interval data of the customer by a utility data feed and a customer data feed in the demand response system, and generating a data set X having two subsets based on meter interval data, a first subset having a population with operable devices and a second subset having a population with non-operable devices;
generating, by a forecasting engine, a participant baseline load (PBL) estimate value from data available in a baseline engine and calculating, by an operability analysis engine, an observed percentage load shed for a customer with respect to a demand-response event, wherein the participant baseline load estimate value is the estimate of a load in absence of the demand-response event;
determining, by the operability analysis engine, a cumulative distribution function for the population in the first subset and for the population in the second subset;
determining, by the operability analysis engine, a probability of negative load shed for population in the first subset and the second subset;
determining, by the operability analysis engine, the probability of observing X negative load sheds out of N events using the a binomial distribution with probability P and sample size N;
using the customer's observed number of positive load sheds after the N events; calculate the probability of customers to be in the second subset;
observing a subset of customers based on the determined probability of the customer having a non-operable device;
taking remedial action for customers with high probability of device failure wherein the devices are one or more switches or signal receptors.

13. The method of claim 12 wherein the utility data feed and the customer data feed are is collected using a large storage database.

14. The method of claim 12 wherein the dataset is expressed as a mixture of lognormal function of the population in the first subset and the second subset.

* * * * *